June 30, 1925.
D. A. DICKEY
1,543,701
MOLD FOR PROPELLERS
Filed Feb. 15, 1919
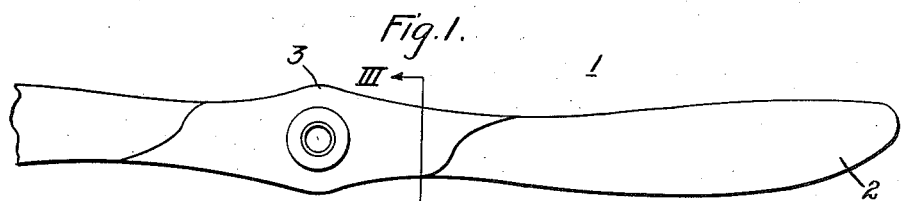
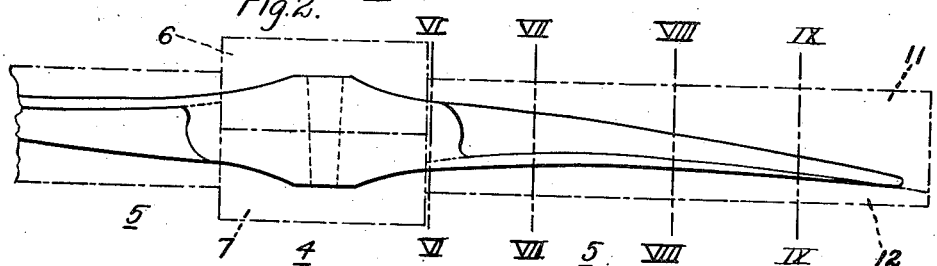
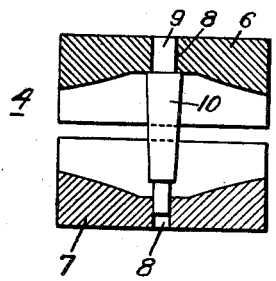
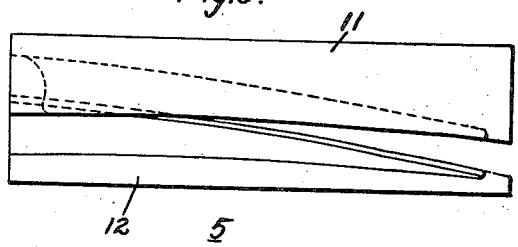
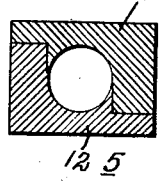 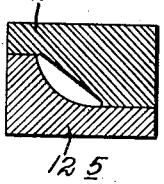 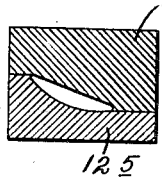 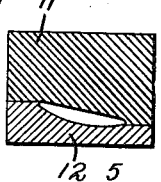
WITNESSES:
J. A. Helsel.
W. H. Woodman
INVENTOR
Daniel A. Dickey.
BY
Wesley G. Carr
ATTORNEY Patented June 30, 1925.

1,543,701

UNITED STATES PATENT OFFICE.

DANIEL ADAM DICKEY, OF WILKINSBURG, PENNSYLVANIA, ASSIGNOR TO WESTINGHOUSE ELECTRIC & MANUFACTURING COMPANY, A CORPORATION OF PENNSYLVANIA.

MOLD FOR PROPELLERS.

Application filed February 15, 1919. Serial No. 277,244.

*To all whom it may concern:*

Be it known that I, DANIEL A. DICKEY, a citizen of the United States, and a resident of Wilkinsburg, in the county of Allegheny and State of Pennsylvania, have invented a new and useful Improvement in Molds for Propellers, of which the following is a specification.

My invention relates to composite molded propellers and to a mold for curing propellers of this character and it has, for one object, the provision of a mold so constructed that propellers of various pitches may be formed in the same mold.

Heretofore, composite molded propellers have been formed by superimposing properly shaped layers of fibrous sheet material, such as paper, duck or the like, impregnated with a suitable binder, such as a phenolic condensation product, which may be hardened under the application of heat and pressure to provide a propeller-shaped body. The body has then been disposed in a properly-shaped mold and there subjected to heat and pressure to compact the sheet material and to harden the binder.

As different types of motors operate at different speeds and develop different quantities of power, it is essential, for the most efficient operation of the motors, and of the propellers which they drive, that each propeller be formed with a certain predetermined pitch in accordance with the type of engine with which it is to be employed and that this pitch be varied according to the characteristics of the particular motor. This necessitates the employment of a large number of expensive and bulky molds.

The primary object of my present invention resides in constructing a mold of such character that propellers of varying pitches may be formed therein at will.

Another object of my invention consists in providing a propeller of novel design such as will permit its being formed in a mold of this character.

With these and other objects in view, my invention will be more fully described, illustrated in the drawings, in the several views of which corresponding numerals indicate like parts, and then particularly pointed out in the claims.

Fig. 1 is a plan view, a part being broken away, of a propeller constructed in accordance with my invention; Fig. 2 is a side elevation of the propeller shown in Fig. 1 with portions of my mold indicated in dot and dash lines; Fig. 3 is a transverse, sectional view of the propeller taken at the line III—III of Fig. 1; Fig. 4 is a central, longitudinal, sectional view of the hub portion of my mold, showing the members slightly separated; Fig. 5 is a side elevation of one of the blade portions of the mold, also showing the members slightly separated, and Figs. 6, 7, 8 and 9 are transverse sections of the mold taken at substantially the correspondingly numbered section lines of Fig. 2.

A propeller 1, constructed in accordance with my invention, may comprise blade portions 2 of the usual shape and design and a hub portion 3 of the usual or any preferred shape and design, the sole difference between the propeller and the propellers as now commonly constructed being that the portions of the propeller, near the hub and between it and non-active portions of the blades, are formed of circular cross section, as clearly shown in Fig. 3.

It will be obvious that, if properly-shaped layers of fibrous sheet material, impregnated with a binder, are stacked to form a propeller-shaped body in which the laminations run lengthwise of the body and in which the portions of the body adjacent the hub are of circular cross section, the blade portions of the assembled body may be reversely twisted, to any desired pitch, without bringing the blade portions out of proper alinement and without producing any changes in the shape of either the hub portion or the blade portions.

In order to provide a means for molding and curing a propeller of this character, with the blade portions of the propeller disposed at any desired pitch, I provide a mold which is best shown in Figs. 2 and 4 to 9 inclusive. The mold comprises an intermediate or hub section 4 and terminal or blade sections 5. The hub section comprises upper and lower members 6 and 7, the opposed faces of which are recessed in such manner that, when the sections are closed, they provide a hub-shaped chamber, as will be apparent from Figs. 2 and 4. If desired, these members may be formed with alined openings 8 to receive the reduced terminals 9 of a spindle-opening-forming-mandrel 10.

Each blade-forming section 5 may comprise upper and lower members 11 and 12, the opposed faces of which are recessed to provide, when the members are in closed position, chambers shaped to properly form the blade portions of the propeller.

In practice, the terminal sections of the mold are disposed against the ends of the hub section so that the several chambers aline and provide a single, continuous and uninterrupted propeller-receiving chamber of proper shape, the portions of the chamber which are to mold the portions of the propeller which are of circular cross section being at the junctures of the terminal sections of the mold and the hub section thereof, as indicated in Fig. 6.

In practising my invention, a propeller body of suitable moldable material, such as superimposed layers of fibrous sheet material, impregnated with a phenolic condensation product, may be assembled. This may be done in any preferred manner as, for example, in the way disclosed in an application filed by me December 30, 1918, Serial No. 268,949, patented Feb. 13, 1923, No. 1,444,959, or in the way disclosed in an application filed by Louis T. Frederick, December 30, 1918, Serial No. 268,954, patented Feb. 14, 1922, No. 1,406,365, assigned to the Westinghouse Electric & Manufacturing Company.

The propeller body thus assembled may be disposed between the properly assembled members of the mold, as indicated in Fig. 2, and the mold, while being heated in any suitable manner, may be closed by a properly designed press to firmly compact the material and bring it to its desired shape and size and to, at the same time, transform the binder into its final hard condition. The mold may then be cooled and removed from the press and the propeller may be taken from the mold.

Obviously, by reversely twisting the terminal or blade-forming sections of the mold about their longitudinal axes and interposing properly proportioned wedges between their upper and lower faces and the platens of the press, the terminal sections may be held in adjusted position to cure blades of any desired pitch.

It will, therefore, be clear that, by constructing propellers of the design indicated and by the employment of a mold of the character described, it is possible, with a single mold, to form propellers having any desired pitch.

Although I have described my propeller and its mold in considerable detail, it will be obvious that various changes in both may be made and, for this reason, no limitations are to be imposed upon my invention other than those indicated in the appended claims.

I claim as my invention:

1. A mold for propellers comprising separable blade-forming sections and a hub-forming section, each comprising co-operating members having their opposed faces recessed whereby, when the members engage each other and the sections are assembled in alinement, they co-operate to provide a propeller-shaped chamber, the portions of the chamber adjacent the ends of the hub-forming section and the inner ends of the blade-forming sections being of substantially circular cross section.

2. A mold comprising a hub-forming section and blade-forming sections capable of being reversely turned about their longitudinal axes relative to the hub-forming section, whereby blades of various pitches may be molded.

3. A mold for propellers comprising a hub-forming section and blade-forming sections, each comprising co-operating members and all adapted, when properly assembled, to provide a propeller-shaped molding chamber of which portions at the meeting points of the sections are substantially circular in cross section.

4. A mold for propellers comprising a hub-forming section and blade-forming sections, each comprising co-operating members and all adapted, when properly assembled, to provide a propeller-shaped molding chamber of which portions at the meeting points of the sections are of substantially circular cross section, the blade-forming sections being adapted to be reversely turned about their longitudinal axes, whereby material positioned in the mold, to be formed into a propeller, may be twisted so that its blade portions may be molded at any desired pitch.

In testimony whereof, I have hereunto subscribed my name this 28th day of Jan., 1919.

DANIEL ADAM DICKEY.